United States Patent
Li et al.

(10) Patent No.: US 6,789,123 B2
(45) Date of Patent: Sep. 7, 2004

(54) SYSTEM AND METHOD FOR DELIVERY OF DYNAMICALLY SCALABLE AUDIO/VIDEO CONTENT OVER A NETWORK

(75) Inventors: Jin Li, Sammamish, WA (US); Jianping Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 09/683,427

(22) Filed: Dec. 28, 2001

(65) Prior Publication Data

US 2003/0135631 A1 Jul. 17, 2003

(51) Int. Cl.[7] .......................... G06F 15/16; G06F 11/00
(52) U.S. Cl. ..................... 709/231; 709/233; 709/247; 370/232; 370/235
(58) Field of Search .............................. 709/231, 232, 709/207, 233, 247; 725/87, 90, 98, 145; 370/230, 231, 232, 233, 234, 235, 238, 465, 468

(56) References Cited

U.S. PATENT DOCUMENTS

| | | | | |
|---|---|---|---|---|
| 6,029,126 A | * | 2/2000 | Malvar | 704/204 |
| 6,430,620 B1 | * | 8/2002 | Omura et al. | 709/231 |
| 6,490,627 B1 | * | 12/2002 | Kalra et al. | 709/231 |
| 6,499,060 B1 | * | 12/2002 | Wang et al. | 709/231 |
| 6,542,545 B1 | * | 4/2003 | Vetro et al. | 375/240.08 |
| 6,557,042 B1 | * | 4/2003 | He et al. | 709/231 |

FOREIGN PATENT DOCUMENTS

EP 0817436 A2 * 1/1998 ........... H04L/12/56

OTHER PUBLICATIONS

Macian, C.; Finthammer, R.; "An evaluation of the key design criteria to achieve high update rates in packet classifiers" Network, IEEE, vol.: 15, Issue: 6, Nov.–Dec. 2001 pp.: 24–29.*

Te–Chung Yang; Kuo, C.–C.J.; "Error correction for wireless image communication with a rate–distortion model" Signals, Systems & Computers, 1997. Conference Record of the Thirty–First Asilomar Conference on, vol.: 2, Nov. 2–5, 1997 pp.: 963–967 vol. 2.*

Nakajima, Y.; Hori, H.; Kanoh, T.; "Rate conversion of MPEG coded video by re–quantization process" Image Processing, 1995. Proceedings., International Conference on, vol.: 3, Oct. 23–26, 1995 pp.: 408–411 vol. 3.*

(List continued on next page.)

Primary Examiner—William A. Cuchlinski, Jr.
Assistant Examiner—Tam T. Phan
(74) Attorney, Agent, or Firm—Lyon & Harr, LLP; Mark A. Watson

(57) ABSTRACT

A system and process for streaming delivery of dynamically scalable media content over a network, such as, for example, the Internet or a wireless network, while automatically accounting for both fluctuating network bandwidth and packet loss. A system of rate-distortion based packet selection and organization is used to maximize the quality of streamed media files that have been encoded using any conventional scalable encoder. Media file quality is maximized for available bandwidth by scoring packets comprising encoded media files based on their contribution to the quality of a reconstructed media file, then preferentially transmitting those packets having the highest scores. In addition, where packets are lost during transmission, those packets that will provide the maximum rate-distortion decrease, are preferentially retransmitted prior to other lost packets which, if transmitted in the same time slot, would provide a lesser rate-distortion decrease.

27 Claims, 5 Drawing Sheets

OTHER PUBLICATIONS

Bernd Girod: EE368b Image and Video Compression Rate Distortion Theory No. 15; Retrieved from http://www.stanford.edu/class/ee368b/Handouts/04–RateDistortionTheory.pdf on Jun. 2, 2004.*

T. Moriya, N. Iwakami, A. Jin, and T. Mori, "A Design of Lossy and Lossless Scalable Audio Coding," *IEEE International Conference on Acoustics, Speech, and Signal Processing (ICASSP '00)*, 2000, vol. 2, pp. 889–892.

Q. Zhang, W. Zhu, and Y. Zhang, "Network–adaptive Rate Control with TCP–Friendly Protocol for Multiple Video Objects," *IEEE International Conference on Multimedia and Expo (ICME) 2000*, Jul. 2000, pp. 1055–1058.

P. E. Kudumakis and M. B. Sandler, "Wavelet Packet Based Scalable Audio Coding," *IEEE ISCSs'96*, 1996, vol. 2, pp. 41–44.

M. Podolsky, C. Romer, and S. McCanne, "Simulation of FEC–Based Error Control for Packet Audio on the Internet," *Proceedings of Infocom '98*, San Francisco, CA, Mar. 1998, pp. 505–515.

C. S. Perkins, O. Hodson, and V. Hardman, "A Survey of Packet–Loss Recovery Techniques for Streaming Audio," *IEEE Network Magazine*, Sep./Oct. 1998, pp. 40–48.

A.C. Beers, M. Agrawala, and N. Chaddha, "Rendering from Compressed Texture," *Computer Graphics (Proc. SIGGRAPH '96)*, 1996, pp. 373–378.

A. Said and W. A. Pearlman, "A new, fast, and efficient image codec based on set partitioning in hierarchical trees'," *IEEE Transactions on Circuits and Systems for Video Technology*, vol. 6, Issue 3, pp 243–252, Jun. 1996.

* cited by examiner

SYSTEM AND METHOD FOR DELIVERY OF DYNAMICALLY SCALABLE AUDIO/VIDEO CONTENT OVER A NETWORK

BACKGROUND OF INVENTION

1. Technical Field

The invention is related to a codec-independent system for efficiently delivering media content, such as, for example, scalable coded audio and/or video content, over a network, such as the Internet or a wireless network, and in particular, to a system and method for automatically and dynamically delivering streaming media content which is optimally scaled in real time to match current network bandwidth and packet loss ratio.

2. Related Art

Reliable delivery of streaming audio or video media content or some combination thereof over an inherently unreliable packet-based network such as the Internet is a challenging task. During any given connection between a server and one or more clients, the available bandwidth between the server and any given client can vary greatly, and individual data packets representing encoded portions of the streaming media can be lost or delayed. Consequently, it is difficult to guarantee a smooth and consistent playback quality for streaming media.

For example, one common problem frequently observed with a network such as the Internet is that because such networks have very little guarantee of quality of service (QoS), data packets are often lost or delayed during transmission. Consequently, data packets comprising portions of media data files may arrive at a client either late, out of sequence, or may not arrive at all. Further, where data packets representing a media type of data file are lost or overly delayed beyond a predetermined minimum time constraint, the result is typically a degraded or irreparably damaged media file. Such loss or delay tends to produce noticeable artifacts in the media as the encoded packets are decoded and combined for playback on the client.

Another common problem is that the available bandwidth of a network such as the Internet typically fluctuates considerably over time for a variety of reasons, including network traffic, number of users, etc. Consequently, the available bandwidth between any given server and client, or any given source and destination, will typically fluctuate during any given connection session. Such variance in available bandwidth is not typically of great concern with non-media data files, however, with streaming media, the fluctuations can result in drastic changes in the quality of the media playback over time, along with noticeable artifacts in the playback as the playback quality changes.

In view of the aforementioned problems, a number of conventional media delivery schemes have been created in an attempt to deliver streaming media over a network such as the Internet. For example, one of the most basic schemes for streaming audio or video files simply compresses the file into a single bitstream. The packets representing this bitstream are then sent sequentially over the Internet from a server to a client where they are decoded, reassembled, and presented for playback. However, because the bitstream cannot typically be altered after it has been compressed, it is difficult to adapt to fluctuating network bandwidth conditions.

Several conventional schemes for streaming media files have expanded on the aforementioned media delivery scheme by using a multi-rate scheme to generate several compressed media files at different bit rates for each media file. The server then determines the available bandwidth between the server and the client, and sends the compressed media file having the highest bit rate that can be successfully transmitted using the given bandwidth. The server will then automatically change to either a higher or lower bit rate version of the media file, as appropriate, where the bandwidth between the server and client changes during transmission. One of the problems with switching to a file having a different bit rate is that there tends to be noticeable artifacts in file playback where file bit rate is changed during playback. Another problem is that more storage space is required on the server because multiple versions of each media file, compressed at different bit rates, must be stored to account for the available bandwidth.

The playback provided by the aforementioned schemes has been greatly improved by the simple addition of the concept of buffering. With buffering, playback of the media file is delayed on the client for a period of time, typically measured in a number of seconds. Such buffering tends to smooth out bandwidth fluctuations, thereby reducing, but not entirely eliminating the need to sometimes switch between different media file bit rates. As with the previous schemes, data packets are sometimes lost during transmission. However, where a packet is lost during transmission, the use of a buffer typically provides a window of time during which any lost packets can be retransmitted. If the retransmitted packets are received in time, the playback of the media file is not interrupted. However, if any of the retransmitted packets are not received in time, the playback of the media file will have noticeable artifacts corresponding to the lost packets.

Because lost packets can seriously degrade media playback, several schemes have been developed to address occasional packet loss. For example, several conventional schemes use an Automatic Retransmission Request (ARQ) which retransmits lost packets after the server receives a negative acknowledgement (NACK) from the client for any given packet. Such schemes begin to degrade rapidly as the packet loss ratio increases.

Other conventional schemes address the packet loss problem by using Forward Error Correction (FEC). FEC involves the transmission of parity packets along with the data packets of the media file. These parity packets can often be used to recover or regenerate lost data packets by using the received data packets along with the parity packets to recreate lost packets. Such schemes provide for a fairly reliable delivery of streaming media where the packet loss ratio is low. However, as the packet loss ratio increases, the ability of FEC schemes to recover lost packets quickly degrades, thereby also causing the playback of the media file to degrade.

Related schemes for addressing the packet loss problem go a step further by using interleaving and buffer management to disperse burst errors caused by a lost packet into random errors in the bitstream which is then further corrected by using an FEC scheme. As with the aforementioned FEC schemes, these schemes ensure a fairly reliable delivery of streaming media where the packet loss ratio is low. However, as with the previous schemes, as the packet loss ratio increases or fluctuates widely, the ability of these schemes to correct for lost packets quickly degrades, thereby again causing the playback of the media file to be degraded.

Still other schemes have achieved even better results for streaming media files over a network such as the Internet by using the concept of scalable audio or video coding. With scalable coding of audio or video, the compressed bitstream is comprised of a number of layers of decreasing importance level. As the bandwidth between the server and the client increases, packets representing more layers are transmitted. Conversely, as the bandwidth decreases, fewer packets representing layers are transmitted. Decoding of the media file can be achieved using only a subset of the layers. However, only switching among layers does not achieve an optimum transmission performance for the scalable coded media. Since there is no special processing of the lost packets, the quality of the decoded media will decrease rapidly as the packet loss ratio increases.

Therefore, what is needed is a system and method for reliably delivering streaming audio or video media content or some combination thereof over a network such as the Internet. Such a system should automatically account for fluctuations in available bandwidth between the server and client while maximizing the quality of streamed media files during client playback. Further, such a system should automatically minimize any degradation of streamed media files caused by packet loss during network transmission of the streamed media files.

SUMMARY OF INVENTION

The present invention involves a new system and method which solves the aforementioned problems, as well as other problems that will become apparent from an understanding of the following description by providing a network aware rate-distortion optimization solution for addressing the problems of streaming media files over a network such as, for example, the Internet or other wired or wireless network. Such problems include bandwidth fluctuations between a server and one or more clients, and packet loss during streaming of media files between the server and the clients.

A network aware rate-distortion optimization system and method according to the present invention uses any conventional scalable coding scheme to first generate at least one encoded bitstream consisting of a number of Data Units (DUs) for at least one media file. As is well known to those skilled in the art, the bitstream of a scalably encoded media file can be truncated at any point while still allowing decoding of the received portion of the bitstream. In other words, a set or subset of the DUs comprising any bitstream of a scalably encoded media file can be used to reconstruct the encoded media file as various levels of resolution or quality.

The contribution of each of the DUs to the overall quality of the decoded media file is first calculated, with higher scores being assigned to those DUs having a greater influence on the quality of the decoded media file. In particular, those DUs providing the greatest decrease in rate-distortion of the decoded media file will receive higher scores. Further, in one embodiment, the size of particular DUs is also used to determine the score for that DU. In particular, scores are reduced in proportion to the size of a particular DU, as it is more expensive, in terms of bandwidth, to send a single large DU then it is to send a number of smaller DUs.

In alternate embodiments of the present invention, additional elements are also considered in scoring DUs. For example, an element which is used in one embodiment of the present invention for scoring DUs is called a "reliance factor." This reliance factor accounts for the fact that while a truncated bitstream of a scalably encoded media file can be decoded, any portion of a bitstream that relies on a missing DU can not be decoded. In other words, the reliance factor accounts for the fact that one or more current DUs may rely on the receipt of one or more prior DUs before it can be decoded.

In another embodiment, a "sent status" is included in scoring DUs. The sent status is simply an indication of whether a DU has been sent, or whether its receipt has been negatively acknowledged, i.e., a NACK. This NACK is simply part of a conventional ACK/NACK network protocol for determining whether network packets have been received by a client after being sent from a server. The sent status helps to reduce potentially wasted use of the available bandwidth by eliminating duplicate sends of DUs that have already been sent without receiving a NACK.

Still another embodiment of the present invention includes the use of a probability of on-time delivery for particular DUs in computing the score for those DUs. For example, where a DU is delivered too late to be decoded for playback of a streamed media file, the transmission of that DU is simply a waste of bandwidth, as it is not usable when it is late. Such bandwidth could have been better used to transmit other usable packets. As the probability of on-time delivery decreases, the score for the particular DU will also decrease.

Finally, in yet another embodiment, a "balance factor" is used to address the importance of near future time slots. In particular, those DUs that are required more immediately if they are to be useful for improving the rate-distortion of a streamed media file are considered to be more important than those DUs having far future time slots. In other words, it is more critical to deliver DUs which are to be used sooner rather than delivering those DUs which are to be used later. Thus, in this embodiment, the scoring of individual DUs is adjusted to reflect the urgency of sending the DU if it is to be used. This element serves to balance between the quality of the streamed media file and error robustness.

It should be noted that the scoring of DUs is dynamic in the sense that the scores of particular DUs may change over time, as the scores for DUs are computed repeatedly during the transmission over the network. The elements and factors described above may change over time as the network conditions, receipt status of the DU and the time to play the DU change, thereby potentially changing the scores of particular DUs.

The system and method according to the present invention then automatically adapts to network bandwidth fluctuations by transmitting either more or fewer data packets representing DUs of the encoded media file depending on the available bandwidth. Data units representing the media file are streamed as packets from the server to the clients based on the score calculated for each DU. In particular, those DUs having a higher score, and thus a greater influence on the quality of the decoded media file are transmitted first, with less important DUs being transmitted as allowed by the available bandwidth. In other words, those DUs that offer the greatest distortion decrease per coding rate, and thus have a higher calculated score, are sent prior to those DUs that have a lower calculated score and thus offer a lesser rate-distortion decrease to the decoded media file. Again, as noted above, additional factors may also be used in determining scores for each DU.

Further, in order to deal with potentially the severe packet loss that is commonly observed during network transmission, only the more important lost DUs are retransmitted. Thus, the system and method of the present invention also determines which DUs, and thus which lost packets, if retransmitted, would be most beneficial to the reconstruction of the media file by providing the greatest decrease in distortion of the decoded media file. This determination of importance is based on which DUs have already been received by the client, which DUs have been lost, and any relationship between DUs, using the scoring criteria described above.

For example, assume that three sets of DUs, ($DU_a$, $DU_b$, and $DU_c$), are represented by three corresponding data packets that are transmitted from a client to a server. Now, assume that the packets representing both $DU_a$ and $DU_c$ are lost during transmission, while the client successfully receives the data packet representing $DU_b$. Finally, assume that decoding of $DU_a$ is independent of the other DUs, while the decoding of $DU_b$ is dependent on having received $DU_c$. If the decoding of $DU_b$ and $DU_c$ together provide a better representation of the media file than the decoding of $DU_a$ by itself, then in this case, $DU_c$, is more important than $DU_a$, and thus should have a higher score than $DU_a$, even though without the receipt of $DU_b$, $DU_c$ by itself may have a lower score than $DU_a$. This is true because $DU_c$ allows the decoding of $DU_b$, and the combination of $DU_b$ and $DU_c$ offers higher quality than $DU_a$ alone. Consequently, $DU_c$ will be retransmitted prior to $DU_a$. Of course, given both sufficient transmission time and bandwidth, $DU_a$ will also be retransmitted.

Consequently, a system and method according to the present invention uses a system of rate-distortion based packet selection to maximize the quality of a streamed media file. Again, with respect to bandwidth, those packets representing DUs having a higher score and thus having a greater contribution to file quality are transmitted prior to those packets having a lower score. Further, with respect to lost packets, those packets that will provide the maximum distortion decrease per rate transmitted based on information of the already received packets are considered to be more important, and will be retransmitted prior to other packets which, if transmitted in the same time slot, would provide a lesser rate-distortion tradeoff. In this manner, a system and method according to the present invention efficiently and reliably delivers streaming media content over the network while automatically accounting for both fluctuating network bandwidth and packet loss.

In addition to the just described benefits, other advantages of the present invention will become apparent from the detailed description which follows hereinafter when taken in conjunction with the accompanying drawing figures.

BRIEF DESCRIPTION OF DRAWINGS

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
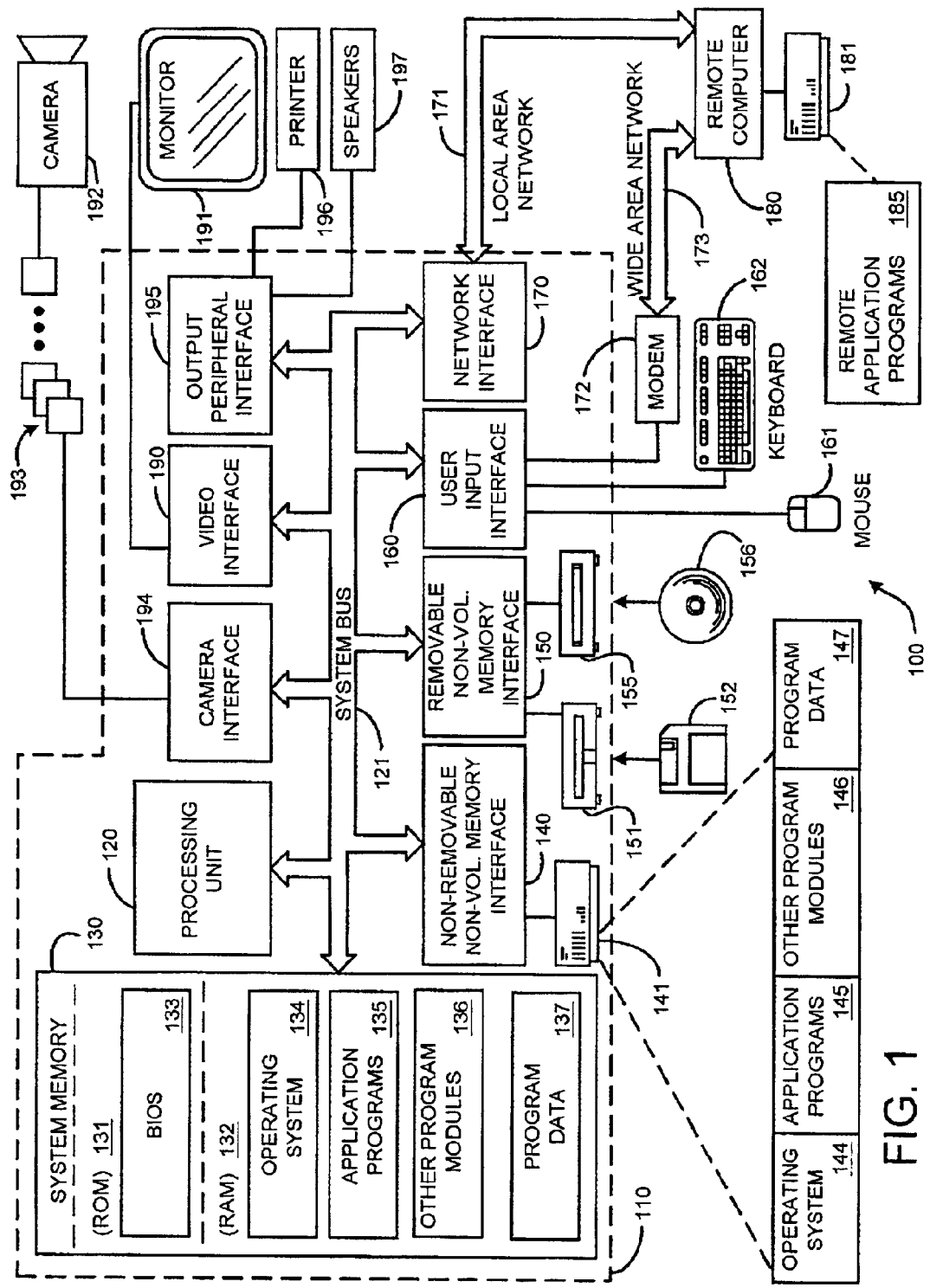
FIG. 1 is a general system diagram depicting a general-purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention.

2.0 Introduction

In general, the present invention involves a new system and process for streaming delivery of dynamically scalable media content over a network such as, for example, the Internet or other wired or wireless network, while automatically adapting to network bandwidth fluctuation and packet loss level. As described in detail below, scalable encoded media files are comprised of a number of Data Units (DUs), with one or more DUs being packaged into a network packet for delivery to at least one client. Typically, such media is streamed from one or more servers to one or more clients. A system of rate-distortion based packet selection is used to maximize the quality of streamed media files that have been encoded using any conventional scalable encoder.

Streamed media file quality is maximized for available bandwidth by first calculating scores for each DU comprising an encoded media file. These scores are determined based on each DU's contribution to the quality of a reconstructed media file. In particular, those DUs offering the highest distortion decrease per rate spent are given the highest scores. Those DUs having the highest scores are then preferentially transmitted in one or more packets based on available network bandwidth. Where packets are lost during transmission, those DUs that will provide a maximum rate-distortion tradeoff, based on which packets, and thus which DUs, have already been successfully received, are preferentially retransmitted in one or more packets prior to other DUs which, if transmitted in the same time slot, would provide a lesser rate-distortion trade-off.

2.1 Scalable Coding of Media Files

Media files such as, for example, audio files, video files, still images, text captions, etc., or any combination thereof, may be encoded using any of a number of conventional scalable encoding techniques. Scalability with respect to encoding media files is a concept well known to those skilled in the art. Consequently, the concept of scalable coding will be only generally summarized below. As noted above, any conventional scalable coding technique can be used by a system and method according to the present invention.

In general, scalable coding allows for a layered representation of a coded bitstream. A "base layer" provides the minimum acceptable quality of a decoded media file, while one or more additional enhancement layers serve to improve the quality of a decoded media file. Each of the layers is represented by a separate bitstream. Scalable coding of a media file allows one or more source bitstreams representing the media file to be transmitted and received at various levels of quality. Typically, more than one source bitstream is required when the media file includes more than one media type, such as, for example, a video file with one or more associated audio tracks. Scalable encoding of the media file produces sets of Data Units (DUs) that represent each bitstream. When these DUs are subsequently decoded and combined, they reproduce the bitstreams of the original media file.

The concept of varying levels of quality arises with scalable encoding because a subset of the DUs representing the bitstreams of the media file can be decoded and combined to reproduce a lesser quality copy of the original media file. The quality of the reproduced media file typically increases as the number of decoded DUs is increased. Consequently, decoding the entire set of DUs for a given bitstream of a media file will result in the best possible decoded copy of the bitstream for that media file.

In particular, scalable coding typically generates a plurality of layered bitstreams, each consisting of a number of bitstream segments or "data units" (DUs), where a subset of the DUs can be extracted to reconstruct the bitstreams of the original media file at a number of lower quality levels than that of the original. In other words, using a conventional scalable encoding scheme, each of the one or more bitstreams of an encoded media file exhibits the property that the resultant bitstream can be truncated at any of a number points while still yielding a decodable signal. However, the quality of the decoded signal will decrease as more of each bitstream is truncated. Conversely, the quality of the decoded signal will increase as less of each bitstream is truncated, with the best quality decoded signal using bitstreams that have not been truncated.

It should be noted that with complex media files, such as, for example, a video file containing both audio and a text caption, multiple sets of layered bitstreams may be generated by the scalable encoder. In particular, the exemplary complex media file would have three sets of layered bitstreams, e.g., a set of video bitstream layers, a set of audio bitstream layers, and a set of caption bitstream layers. In operation, each of these bitstreams sets would be simultaneously streamed, as necessary for reproduction of the original media file, from the server to one or more clients, with each bitstream set being independently decoded on the client side and combined for playback as a reconstruction of the complex media file.

Each encoded bitstream itself typically contains a header which describes the general structure of the bitstream and allows the bitstream to be decoded. In particular, the header contains information describing the encoded media file, such as, for example, a sampling rate of the media file, number of channels of the media file, number of subbands in the encoded media file, number of layers in the encoded media file, timing of each data frame, and scalable encoding methods used to encode the media file. However, it should be noted that the specific types of information included in the header are dependent upon the type of scalable encoder used to encode the media file. For example, with respect to video encoding, well known scalable encoding techniques include SNR scalability, spatial scalability, temporal scalability and data partitioning. Again, scalable encoding is well known to those skilled in the art, as are the structure and contents of headers associated with media files encoded using a scalable encoder.

Following the header, there is sequence of data frames, with each data frame representing a time frame T of the compressed media file. Consequently, the n th data frame contains all of the compressed data between the time $(n-1)T$ and n T. Ideally, data frames encoded by the scalable encoder are independently encoded with respect to each other. However, weak correlation between frames is acceptable so long as the base layer can always be delivered over the network given the available bandwidth. As noted above, the base layer can best be described as a correlated part of the data frames which allows for the minimum acceptable quality or resolution of the streamed media file. Consequently, if sufficient bandwidth is not available to transmit the DUs representing at least the base layer, then successful streaming of the encoded media file is not possible. Transmission and decoding of subsequent enhancement layers represented by one or more DUs allows for greater quality or resolution, i.e., less rate-distortion or better perceptual quality, of the streamed media file.

As discussed above, each of the aforementioned data frames consists of a number of DUs, each of DUs is the smallest unit in the streaming media delivery. Typically, the structure of each data frame in a given bitstream is usually the same. One example of a data frame for an encoded media file can be described with respect to a simple audio file. In particular, assuming that the encoded media file is a stereo audio file with K subbands, or frequency ranges, and that each subband is encoded and sliced into L layers, then there are a total of 2 KL DUs in each data frame. Further, a bit allocation table is attached to each data frame. This bit allocation table specifies the bitstream length, typically in bytes, of each DU in the data frame. In general, the bit allocation table is used by the server for bitstream assembly and does not need not to be explicitly transmitted to the client.

Figure 2:
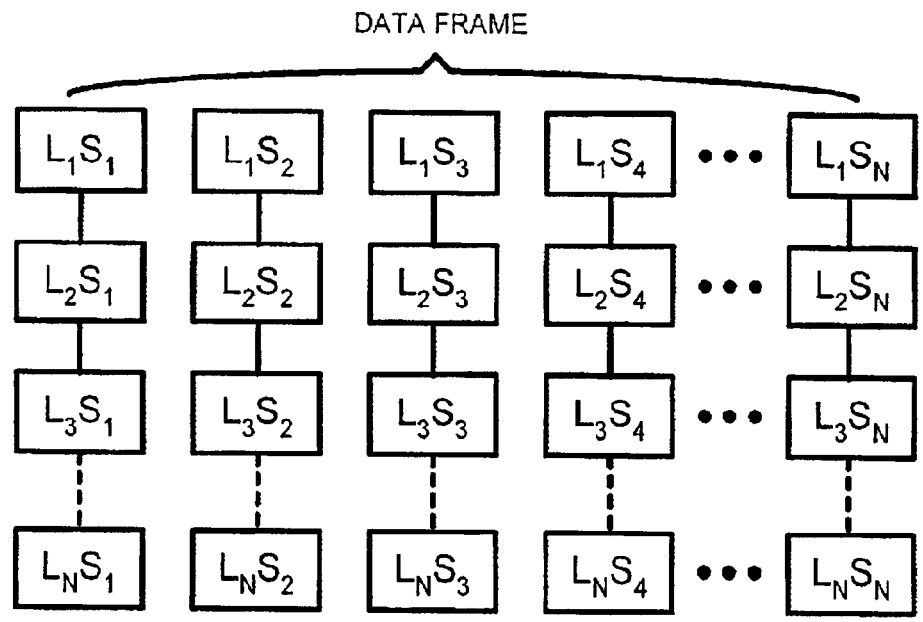
FIG. 2 illustrates an exemplary data frame of a scalable encoded media file in accordance with the present invention.

FIG. 2 illustrates the structure of a typical data frame at a given time slot, t, with each DU in the data frame being indicated by $L_x S_y$, where $L_x$ indicates the layer of each particular DU, while $S_y$ indicates the subband of each particular DU. Clearly, any given data frame may have any number of layers and subbands, depending upon the scalable encoding method used.

A system and method according to the present invention associates a "companion file" with the encoded media file. This companion file includes information that is not useful for bitstream decoding, but is useful for bitstream reassembly and delivery, e.g., the location index and the effect of each DU on the overall quality of the media file. For example, a typical companion file for audio coding would include information such as the distortion characteristics of the DUs and indexes of the DUs representing the encoded audio file. The companion file also describes the relationship between DUs, such as, for example which DUs, if any, are required for the successful decoding of any other DUs.

2.2 System Overview

Figure 3:
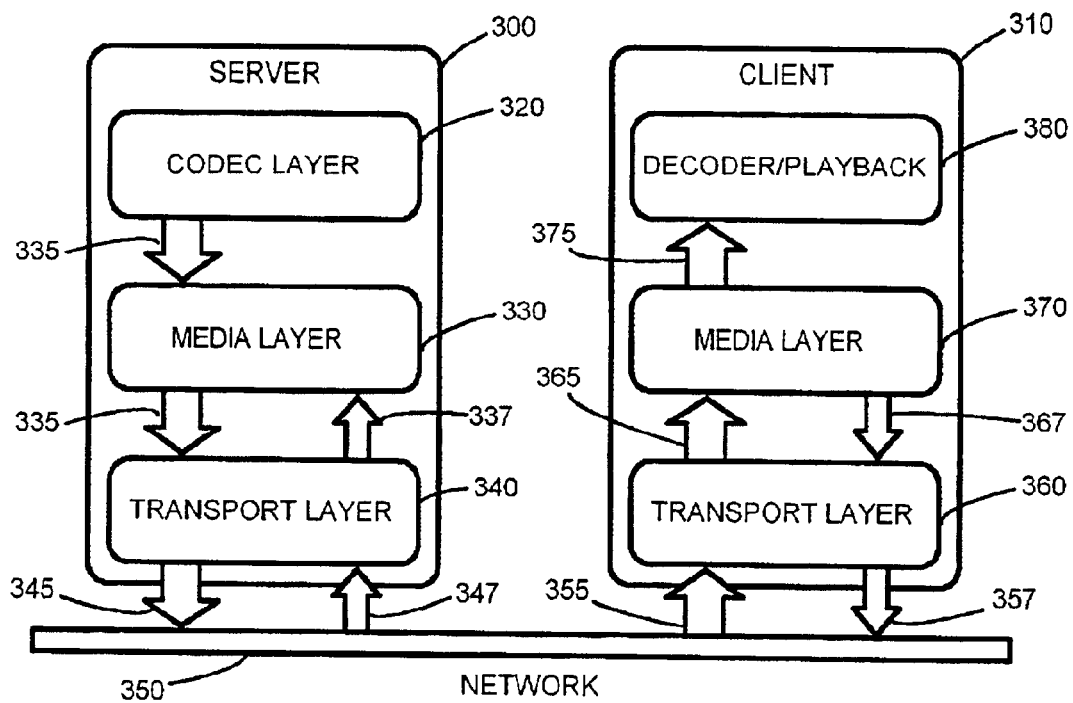
FIG. 3 is an exemplary system diagram illustrating a generic client/server relationship for streaming scalable media in accordance with the present invention.

In general, as illustrated by the generic client/server diagram of FIG. 3, a system and method according to the present invention for delivering dynamically scalable streaming media content over a network while automatically adapting to network bandwidth fluctuation and packet loss level is comprised of at least one server 300 and at least one client 310. Both the servers 300 and the clients 310 include three basic levels. In particular, the servers 300 include a server codec layer 320 in communication with a server media layer 330, which in turn is in communication with a server network transport layer 340. This server network transport layer 340 is in communication with a client network transport layer 360 of least one client 310 across a wired or wireless network 350. This client network transport layer 360 is in communication with a client media layer 370, which in turn is in communication with a client decoder/playback layer 380. In this manner, as described in detail below, a server 300 is capable of delivering dynamically scalable streaming media content over a network to at least one client 310 while automatically adapting to network bandwidth fluctuation and packet loss level.

In particular, the codec layers, 320 and 380 of both the server 300 and the client 310, respectively, are comprised of conventional scalable codecs for scalable encoding and decoding of any desired media type. These codec layers, 320 and 380, are network unaware in the sense that the actual coding and decoding of the media file is independent of any network level communications between the server 300 and the client 310. Consequently, any scalable encoder/decoder can be used with a system and method according to the present invention, regardless of the type of network over which the invention is being practiced.

The media layers, 330 and 370, of both the server 300 and the client 310, respectively, serve to packetize the encoded media content according to the network 350 parameters, as described in detail below, and in one embodiment, they conduct forward error correction (FEC). As described below, the media layers, 330 and 370, are aware of the encoded media structure provided by the codec layer 320, but do not themselves encode the data. In fact, as described below, the job of the media layer 330 is to simply identify, score, and provide DUs to the transport layer 340 based on network conditions such as, for example, current network packet loss ratio, current network bandwidth, etc. Similarly, the client media layer 370 simply receives DUs from the client transport layer 360 and reorders them for presentation to the decoder 380. In alternate embodiments, again as described below, the client media layer 370 also performs error correction, i.e., FEC, and buffer control of streamed media files.

The server and client network transport layers, 340 and 360 are simply conventional network transport layers that communicate across a network 350 for the purpose of transporting data packets from the server 300 to one or more clients 310. Such conventional transport layers are well known to those skilled in the art of network communications.

The layered structure introduced above allows a system and method according to the present invention to be easily adapted to different networks and different media types. In order to achieve this flexibility, the interfaces between the codec, media, and transport layers introduced above are designed to be generally independent from each other to the extent possible. In particular, the codec layer is unaware of the media packaging and delivery. In fact, the media packaging and delivery layer is capable of operating on files which are encoded by any scalable encoder. Similarly, the media layer is unaware of how the media is encoded and decoded, and how the media is actually delivered over the network. However, the media layer is capable of analyzing, scoring, and identifying particular DUs for packetization and transport via the network as described below. In particular, the media layer handles media packetization, flow control, network adaptation, etc. Finally, the transport layer is unaware of how or why particular packets are generated; it simply sends and receives such packets over the network 350.

Scalable audio/video media of any conventional type can be handled by a system and method according to the present invention. Such media can be delivered over any conventional network, such as, for example, a TCP/IP based Internet, intranet, or other wired or wireless network.

Figure 4:
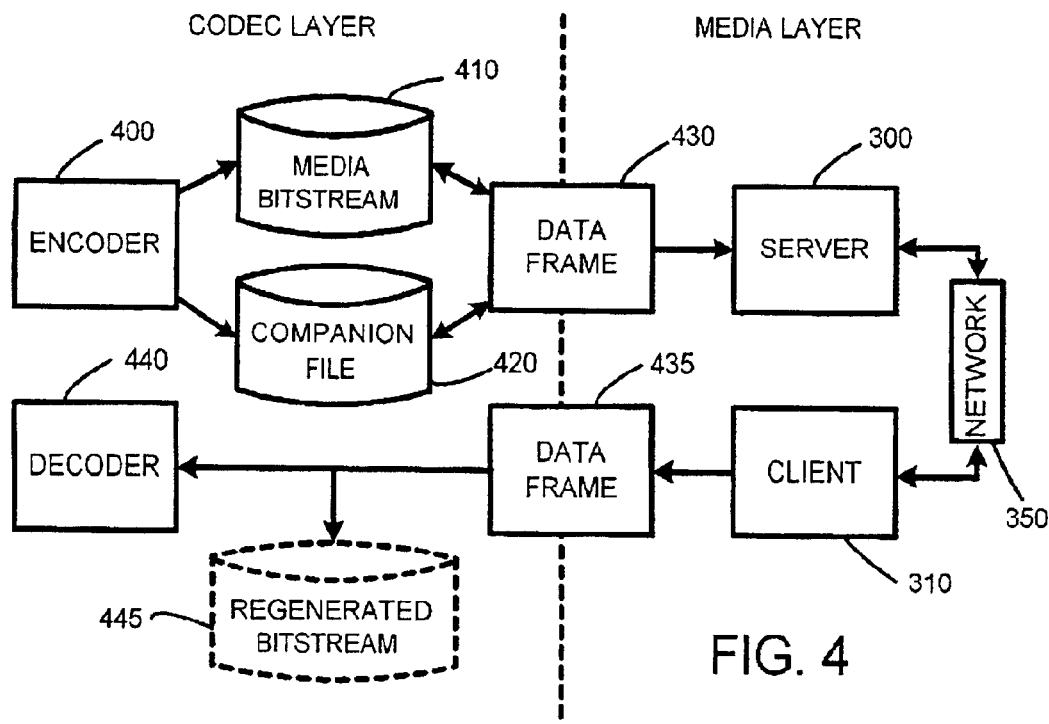
FIG. 4 is an exemplary system diagram illustrating codec and media layers as illustrated in FIG. 3.

FIG. 4 is an exemplary system diagram that illustrates an exemplary interface between the codec layer and the media layer of FIG. 3. In particular, the encoder 400 generates both media bitstreams 410 and a companion file 420, and provides them to the media layer of the server 300 as a series of data frames 430. The media layer of the server 300 then analyzes the data frames, and dynamically arranges and packages DUs into packets for delivery to the client 310 via the network 350. The client then reassembles the data frames 435 from the packetized DUs to regenerate the encoded bitstream which is either provided to a decoder 440, or in one embodiment, buffered to a local bitstream 445 for later decoding and playback. It should be noted that only one data frame is delivered to the client 310 at each network time slot, and that due to bandwidth limitations, and packet loss conditions, as described below, that the regenerated bitstream 435 can be substantially different from the initially encoded bitstream 410.

As further illustrated by FIG. 4, the interface between the codec layer and the media layer is the data frame 430 and 435. This interface allows the codec 400 to operate independently of whatever network 350 is being used for communications between the server and the client 300 and 310, respectively. The codec 400 simply specifies how each data frame 430 is formed, along with the DU structure of the data frame (see FIG. 2). The media layer then processes each data frame, forms score-based packets, as described in detail below, and delivers them to the network 350 for transport. The media layer itself operates in the same manner regardless of the media type provided by the codec layer.

Figure 5:
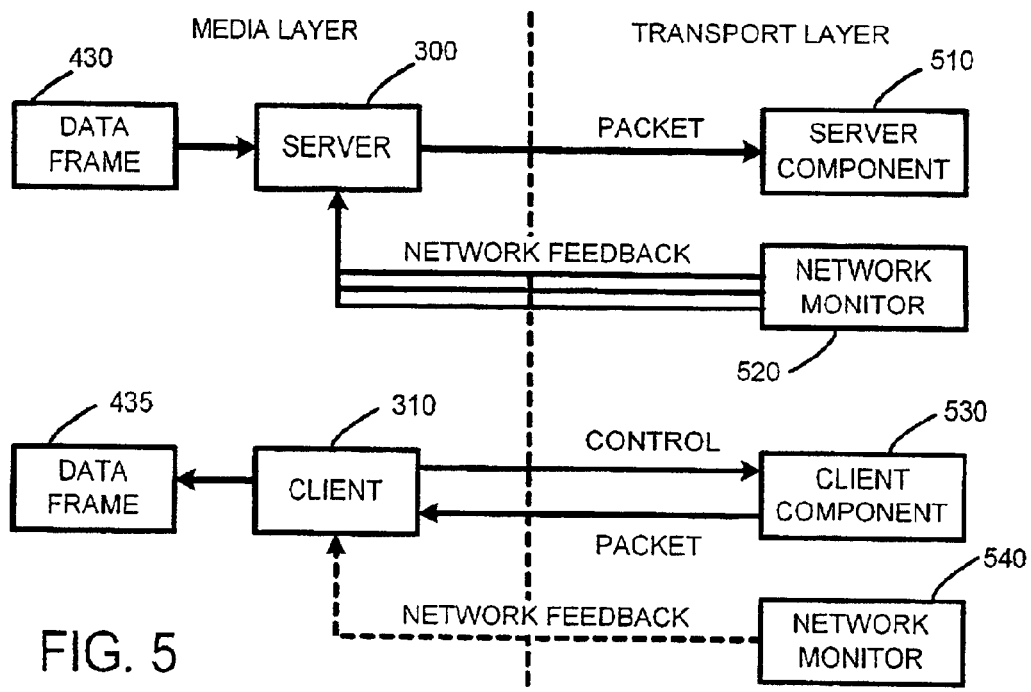
FIG. 5 is an exemplary system diagram illustrating media and transport layers as illustrated in FIG. 3.

FIG. 5 is an exemplary system diagram that illustrates an exemplary interface between the media and transport layers as illustrated in FIG. 3. In general, as described in detail below, the media layer acts as an agent between the network 350 and the transport layer. The media layer scores and identifies DUs for packetization in each timeslot during communication between the server 300 and the client 310. As illustrated by FIG. 5, data frames 430 are provided to the server 300, wherein the DUs comprising the data frames are scored and packetized, then provided to the server component of the transport layer 510. Conventional network monitor schemes 520 and 540 are used to provide network feedback to the media layer of the server 300 and client 310 for use in scoring and packetizing DUs, as described below.

Figure 6:
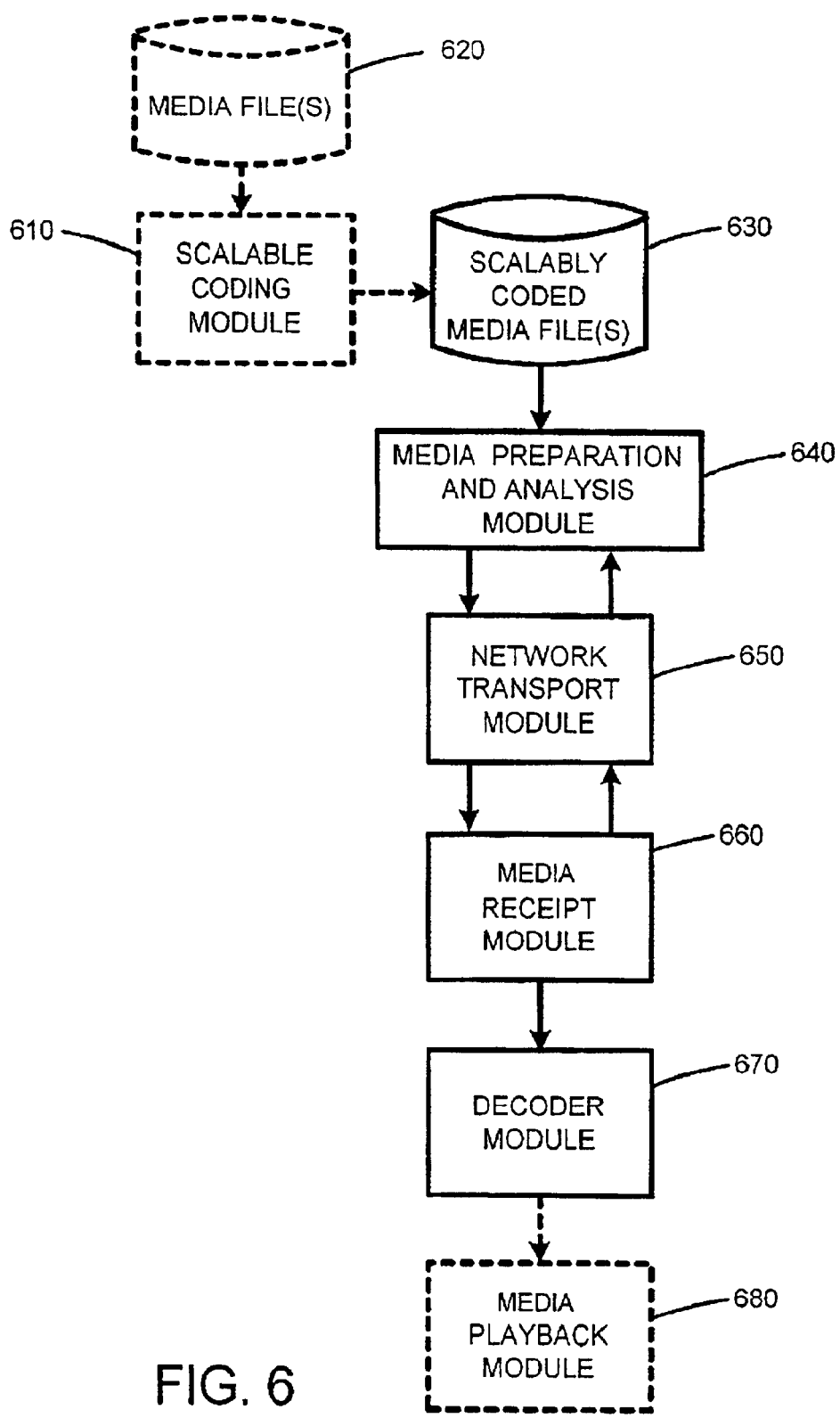
FIG. 6 illustrates an exemplary architectural diagram showing exemplary program modules for implementing the present invention.

In view of FIGS. 3, 4, and 5, FIG. 6 is understood to represent a general system diagram illustrating program modules for implementing the present invention. It should be noted that the boxes and interconnections between boxes that are represented by broken or dashed lines in FIG. 6 represent alternate embodiments of the present invention, and that any or all of these alternate embodiments, as described below, may be used in combination with other alternate embodiments that are described throughout this document.

As noted above, the present invention delivers dynamically scalable streaming media content over a network while automatically adapting to network bandwidth fluctuation and packet loss level. As illustrated by FIG. 6, a system and method in accordance with the present invention uses a scalable encoding module 610 that employs conventional scalable encoding techniques to encode at least one media file 620. Alternatively, a system and method in accordance with the present invention may simply use an encoded media file 630 that has already been encoded using any conventional system for scalable coding. Either way, the encoded media file 630 is provided to a media preparation and analysis module 640.

The media preparation and analysis module 640 performs several functions. The functions performed by the media preparation and analysis module 640 include computing a "score" for each of the DUs, providing selected DUs to a network transport module 650 for network transmission from a server to one or more clients, and determining which DUs are to be retransmitted in the case where network packet loss results in lost DUs.

In general, as described in greater detail below, the media preparation and analysis module 640 computes a score for each of the DUs comprising the bitstreams that represent the encoded media file. In general, the score is based on the improvement to the overall quality of the media file divided by the length of each DU. For example, with respect to an audio media file, the score is determined based on the distortion decrease to the decoded media file that can be attributed to each DU divided by the length of the DU. In addition, the media preparation and analysis module 640 provides DUs to a network transport module 650 which uses conventional network communications protocols such as, for example, UDP, RTP, etc., to transmit the DUs from a server to one or more clients. The network transport module 650 also uses conventional methods to monitor network communications parameters such as the packet loss ratio, average bandwidth, etc. These network communications parameters are then passed back to the media preparation and analysis module 640 which makes a determination as to which DUs are to be either transmitted or retransmitted from the server to the client based on the network parameters determined by the network transport module 650.

For transmission from a server to one or more clients, and to reduce packet overhead, multiple small DUs are typically packaged into a large network packet for delivery by the network transport module 650. When each data packet is delivered to the client, it is received by a media receipt module 660 which uses well known conventional techniques to both receive network communications and report packet receipt loss and network status back to the originating server. Further, the media receipt module 660 also uses conventional network communications techniques to split the received data packets back into the individual DUs that were packaged into the network packet. The DUs, i.e., the individual segments of each encoded bitstream are then merged together by the media receipt module 660, to form the one or more encoded bitstreams representing the original media file. Typically, not all DUs are received, especially when the bandwidth is tight and the packet loss ratio is high. Consequently, the assembled bitstreams are actually potentially truncated versions of the originally encoded bitstreams that are missing zero or more DUs. Again, as noted above, with respect to complex media files, such as those having both audio and video, there will be a number of bitstreams that represent each of the media types in the media file.

The media receipt module 660 then passes the assembled bitstream, or bitstreams, to a decoder module 670 that is a match to the original scalable encoding of the transmitted media file. The decoder module 670 then uses conventional techniques to decode the assembled bitstreams up to the truncation points, with overall quality typically improving as the number of received DUs assembled into each truncated bitstream is increased. As noted above, these decoded assembled bitstreams are a copy of the original media file, albeit at an equal or lesser quality than the original media file. Finally, the decoded copy of original media file may be provided to a conventional media playback module 680 for playback on the client computer, or may be stored on a computer storage media for later use. The media playback module 680 is simply comprised of one or more conventional applications for playing, displaying, rendering, saving, or otherwise providing the media file to an end user via the client computer.

3.0 Operation Overview

The program modules described in Section 2.0 with reference to FIG. 6 are employed to automatically deliver dynamically scalable media content over a networkwhile automatically accounting for both fluctuating network bandwidth and packet loss. This process is depicted in the flow diagram of FIG. 7. It should be noted that the boxes and interconnections between boxes that are represented by broken or dashed lines in FIG. 7 represent alternate embodiments of the present invention, and that any or all of these alternate embodiments, as described below, may be used in combination with other alternate embodiments that are described through this document.

Figure 7:
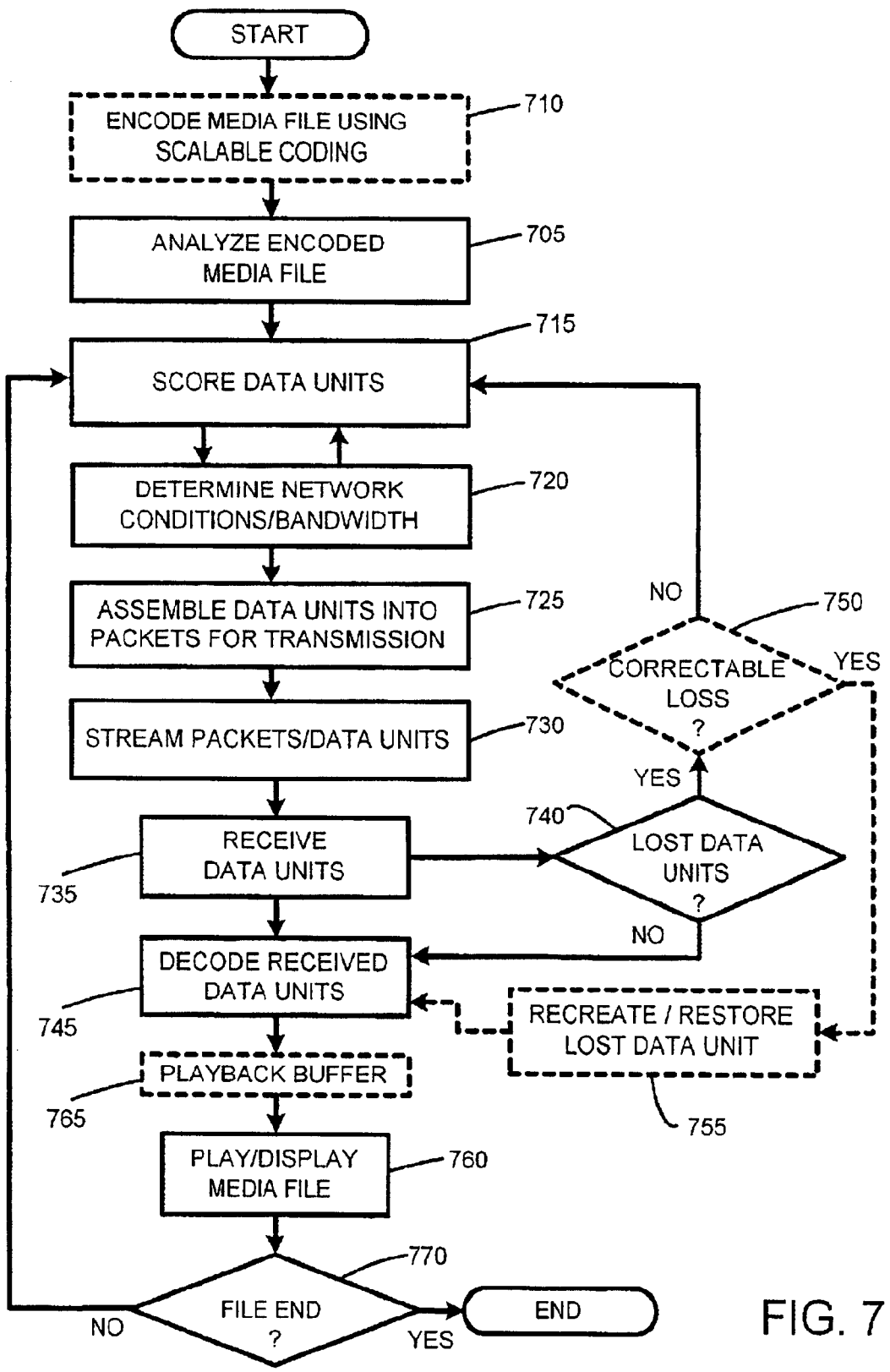
FIG. 7 illustrates an exemplary system flow diagram for implementing the present invention.

Referring now to FIG. 7 in combination with FIG. 6, the process is started by analyzing a media file (Box 705) encoded with a scalable encoder. Further, as noted above, with respect to FIG. 6, the system and method of the present invention may either employ conventional scalable encoding techniques to encode the media file (Box 710), or alternatively, the system and method may simply use a media file that has already been encoded using any conventional system for scalable coding. In analyzing the encoded media file (Box 705), a rate-distortion curve, as described above, is computed for each DU comprising each of the bitstreams comprising the encoded media file.

Next, each of the DUs are scored (Box 715). A more detailed description of the scoring of DUs is provided below in Section 3.1. This scoring of DUs is accomplished using the rate-distortion information for each DU, along with current network conditions (Box 720). As noted above, the current network conditions include information and parameters, such as, for example the packet loss ratio and current bandwidth. Again, it should be noted that such network conditions and parameters are easily determined (Box 720) using well known conventional techniques. Also, it should be noted that, as discussed below, the scoring of DUs is accomplished on an iterative time-slot basis. In other words, each DU is scored based on the current network communications time slot for streaming packets across the network. Consequently, particular DUs may have scores which change over time as the encoded media file is streamed over the network.

Once the scores for each DU have been determined (Box 715), one or more of the DUs are assembled into conventional packets (Box 725) for streaming network transmission (Box 730) using conventional techniques. Organization and assembly of DUs into packets (Box 725) is based on the scores determined for each DU (Box 715), with those DUs having the highest scores in any given time slot given priority for packaging into packets and transmission across the network from the server to one or more clients.

The transmitted packets (Box 730) are then received (Box 735), using conventional network communications protocols. If no packets have been lost during transmission (Box 740), then the packets are separated into the individual DUs comprising the received packets and decoded using a conventional scalable decoder (Box 745). However, if data packets have been lost during transmission, conventional network communications protocols, e.g., ACK/NACK protocols, will allow the server to be aware of the packet loss. Consequently, when scoring data units, (Box 715), packet loss, and thus loss of particular data units is considered in scoring those lost data units.

Alternatively, in one embodiment, assembly of the data units into packets (Box 725) includes conventional Forward Error Correction (FEC) techniques. Consequently, where particular packets are lost, it may be possible to recover those packets, and thus the lost DUs using conventional FEC techniques. Where the packet loss is correctable using FEC techniques (Box 750), then the lost packets, and thus the lost DUs are simply recreated (Box 755) and provided to the decoder for decoding (Box 745).

Further, it should be noted, that as described above, the nature of scalable encoding allows truncated bitstreams to be decoded to reproduce a version of the original media file. Consequently, whether or not DUs or packets have been lost (Box 740) during transmission over the network, so long as those packets and thus DUs representing the base layer of the encoded media file has been received by the client, then the client will be able to decode the received DUs (Box 745). This fact remains true whether or not any lost DUs are retransmitted or recovered as described above.

The decoded DUs are then combined to reproduce a copy of the original bitstreams of the encoded media file which are then provided to a conventional media playback or display device for playback (Box 760). Further, in another embodiment, the decoded bitstreams are first buffered in a conventional playback buffer (Box 765) for purposes of providing a more robust and fault tolerant streaming of DUs. In particular, the playback buffer (Box 765) allows the server more time to both transmit DUs and to retransmit lost DUs, and allows for delays or temporary bottlenecks in network transmission without interrupting playback of the decoded media file (Box 760). Such buffering techniques are well known to those skilled in the art.

The process described above beginning with scoring of DUs (Box 715), and continuing through playback of the decoded media file (Box 760) continues until streaming of the media file has either completed or been terminated by either the server or the client (Box 770).

3.1 Scoring of Data Units

In calculating a "score" for each of the DUs comprising the bitstream layers of an encoded media file, the primary factor considered is the overall quality of the decoded media file. In particular, higher scores are assigned to those DUs providing the greatest decrease in rate-distortion slope of the decoded media file. The concept of calculating a rate-distortionslope for a given DU, or a rate distortion curve for a given bitstream, is well known to those skilled in the art, and will not be described in detail herein. Note that the score for each DU is not based entirely on the distortion decrease, but also on the size of the particular DUs. In particular, scores are reduced in direct proportion to the size of a particular DU, as it is more expensive, in terms of bandwidth, to send a single large DU then it is to send a number of smaller DUs. Consequently, as the size of a particular DU increases, its overall score will decrease.

For example, in one embodiment, the score, G, considers both the distortion decrease, D, provided by a particular DU, as well as the bandwidth cost of transmitting the DU based on the size, s, of that DU. Thus, one exemplary method for determining such a score for a given DU is illustrated by Equation 1, as follows:

$$\text{Score} = G(l, k, t) = \frac{D(l, k, t)}{s(l, k, t)} \qquad \text{Equation 1}$$

where G(l,k,t) represents the score for each DU, with l, k, and t indexing the layer, subband, and timeslot, respectively for each DU. D(l,k,t) represents the rate distortion for each DU, with l, k, and t again indexing the layer, subband, and timeslot, respectively for each DU. Finally, s(l,k,t) represents the size, typically in bytes, of each DU, with l, k, and t again indexing the layer, subband, and timeslot, respectively for each DU.

It should be noted that the successful receipt by the client of any one DU not only enables that DU to be decoded, but it also enables any other subsequent DUs in the same subband that are dependent on the receipt of that DU for decoding to also be decoded. This concept is illustrated by Equation 2 as follows:

$$D(l, k, t) = d(l, k, t) + \sum_{i=l+1}^{l_s} d(l, k, t) \prod_{j=l+1}^{i} P(j, k, t) \qquad \text{Equation 2}$$

As can be seen from Equation 2, the overall distortion decrease that can be attributed to any one particular DU is the rate-distortion decrease attributed to that DU alone plus the rate-distortion attributable to each other subsequent DU, along with the probability that each of those subsequent DUs has also been received.

In further embodiments of the present invention, additional elements are also considered in scoring DUs. Such elements include, for example, a "reliance factor," a "sent status," an "on-time delivery probability," and a "balance factor." Each of these elements may be used either alone with the elements described with reference to Equation 1, or may be used in any combination with the elements described with reference to Equation 1.

In particular, the "reliance factor," R, accounts for the fact that while a truncated bitstream of a scalably encoded media file can be decoded, any portion of a bitstream subsequent to a missing DU can not be decoded. In other words, the reliance factor accounts for the fact that one or more current DUs may rely on the receipt of one or more prior DUs before it can be decoded. This concept can best be described by Equation 3 as follows:

$$\text{Reliance Factor} = R(l, k, t) = \prod_{i<l} P(i, k, t) \quad \text{Equation 3}$$

where the reliance factor R(l,k,t) for each DU, with l, k, and t again indexing the layer, subband, and timeslot, respectively for each DU, is determined by the overall probability that the i DUs upon which a particular DU depends for decoding have been received. It should be noted that such probabilities are conventionally determined based on packet loss probabilities, and that the determination of such probabilities is well known to those skilled in the art. Adding the concept of a reliance factor to Equation 1 is illustrated by exemplary Equation 4 as follows:

$$\text{Score} = G(l, k, t) = \frac{D(l, k, t) * R(l, k, t)}{s(l, k, t)} \quad \text{Equation 4}$$

As noted above, in another embodiment, a "sent status," l, is included in scoring DUs. The sent status is simply an indication of whether a DU has been sent, or whether its receipt has been negatively acknowledged, i.e., a NACK. This NACK is simply part of a conventional ACK/NACK network protocol for determining whether network packets have been received by a client after being sent from a server. The sent status helps to reduce potentially wasted use of the available bandwidth by eliminating duplicate sends of DUs that have already been sent without receiving a NACK. If a DU has been sent, the sent status is given a value of zero, else it is given a value of one minus the current packet loss ratio (PLR) between the server and a given client to indicate that either it has not yet been sent, or that a NACK has been received with respect to the packet containing the particular DU. The score for each DU can then be multiplied by the sent status.

Where the sent status has a value of zero, indicating that the DU has already been sent, the score for that DU will drop to zero, i.e., multiplication by zero is equal to zero. Any DU having a score of zero will not be transmitted. Addition of the concept of a sent status to Equation 1 can be represented by Equation 5 as follows:

$$\text{Score} = G(l, k, t) = \frac{D(l, k, t) * I(l, k, t)}{s(l, k, t)} \quad \text{Equation 5}$$

where l(l,k,t) for each DU, indicates the sent status of each DU, with l, k, and t again indexing the layer, subband, and timeslot, respectively for each DU.

Still another embodiment of the present invention includes the use of a conventional probability of on-time delivery, ar(t) for particular DUs in the current timeslot, t, in computing the score for those DUs. For example, where a DU is delivered too late to be decoded for playback of a streamed media file, the transmission of that DU is simply a waste of bandwidth, as it is not usable when it is late. Such bandwidth could have been better used to transmit other usable packets. As the probability of on-time delivery decreases, the score for the particular DU will also decrease. In particular, ar(t) represents the probability that the DU(l, k, t) will arrive at the client early enough for playback. This probability, ar(t), is modeled by observing the roundtrip time of packet delivery between the server and the client. The use of factor ar(t) prevents the sending of near future DUs which may not arrive on time for playback. Addition of the concept of the probability of on-time delivery to Equation 1 can be represented by Equation 6 as follows:

$$\text{Score} = G(l, k, t) = \frac{D(l, k, t) * ar(t)}{s(l, k, t)} \quad \text{Equation 6}$$

Finally, in yet another embodiment, a "balance factor," pr(t), is used to address the importance of near future time slots. In particular, those DUs that are required more immediately if they are to be useful for improving the rate-distortion of a streamed media file are considered to be more important than those DUs having far future time slots. In other words, it is more critical to deliver DUs which are to be used sooner rather than delivering those DUs which are to be used later. Thus, in this embodiment, the scoring of the individual DUs is adjusted to reflect the urgency of sending the DU if it is to be used. This element serves to balance between the quality of the streamed media file and error robustness. Therefore, as the balance factor, pr(t), is increased, the score of the associated DU will also increase, thereby increasing the likelihood that the higher scored DU will be preferentially transmitted. Determination of what size or magnitude balance factor provides the best results is best accomplished by experimentation. In particular, a flat pr(t), i.e., constant, favors the delivery of far future data frames and thus far future DUs, thereby improving the stability of any decoded and rendered media file. In contrast, a decreasing pr(t) as t increases favors the delivery of near future data frames and thus near future DUs, thereby improving near future quality of the decoded and rendered media file.

The ideal balance factor will depend upon the reliability and packet loss ratio of the network, the encoding method used and the distortion decrease provided by particular DUs. Addition of the concept of the balance factor, pr(t), to Equation 1 can be represented by Equation 7 as follows:

$$\text{Score} = G(l, k, t) = \frac{D(l, k, t) * pr(t)}{s(l, k, t)} \quad \text{Equation 7}$$

As noted above, each of the aforementioned scoring elements may be used in combination. For example, where all of these elements are considered together for scoring of DUs, the resulting score can be determined by Equation 8, as follows:

$$\text{Score} = \text{Equation 8}$$
$$G(l, k, t) = \frac{D(l, k, t) * R(l, k, t) * l(l, k, t) * ar(t) * pr(t)}{s(l, k, t)}$$

It should be noted that the scoring of DUs is dynamic in the sense that the scores of particular DUs may change over time. The reliance factor $R(l,k,t)$ and sent status $l(l,k,t)$ change according to the receipt of the DU, and the on-time delivery factor $ar(t)$ and balance factor $pr(t)$ change as time passes by. Changes in network conditions such as bandwidth and packet loss ratios may potentially change the scores of particular DUs as well. Scores for the DUs are computed for each time slot during transmission over the network.

4.0 Working Example

As noted above, the present invention is not limited to scalable dynamic streaming of audio content, and as discussed above, the invention is in fact capable of streaming media content of any type, such as, for example, audio, video, graphic images, or any combination thereof. However, for purposes of explanation and clarity, provided below is a simple working example of the present invention which illustrates the concepts described above for scalable encoding and dynamic streaming of a simple audio media file. This working example illustrates the concepts of the present invention by describing dynamically scalable streaming of an audio file from a server to a client over the Internet.

Typically, audio requires less bandwidth than video. Consequently, it is easier to deliver audio media content over the Internet than it is to deliver high quality video over the Internet. However, a high quality audio stream still requires in the range of about 64 to 128 kbps (kilo bits per second) of bandwidth. Requiring a continuously available connection offering such bandwidth can make delivery of such an audio file via the Internet a challenging task, especially over long distances, such as, for example, from one continent to another. However, using a system and method according to the present invention can make such a delivery task more manageable.

In general, in order to deliver an audio file over a network such as the Internet using a system and method according to the present invention, the audio signal is first compressed using any type of conventional scalable compression. However, for purposes of explanation, a working embodiment of such scalable compression is described below.

The scalable compression used in a working example of the present invention accomplishes scalable compression of an audio file by first splitting an audio signal represented by the audio file into individual time slots. Each of these time slots is then filtered by a conventional PQF-type filter and down-sampled into four subbands which provide scalability with respect to audio sampling resolution of the audio file. Modified DCT (MDCT) is then performed on each decomposed subband, and the transformed coefficients are then weighted according to a psychoacoustic mask. Finally, each weighted subband is bitplane encoded into an embedded bitstream. At this point, the embedded bitstream has the property that the resultant bitstream can be truncated at any point and still yield a decodable, albeit lower quality signal. In other words, the original audio file has been scalably encoded into a bitstream.

Several bitrates can be assigned to the embedded encoded audio. For each coding bitrate, the available bits are assigned to the four subbands according to a rate-distortion criterion. The bitstreams of the subbands are then truncated and concatenated to form the encoded audio. For the lowest coding bitrate, a set of four truncated bitstreams from each subband forms the "base layer" of the embedded audio. Simply transmitting the difference between the truncated bitstream of this layer and that of the previous layer will provide a higher bitrate for the transmitted audio file. Suppose there are a total of n bitrate points, each subband bitstream is thus truncated into n segments, with each segment of the truncated bitstream of a subband termed a Data Unit (DU). As noted above, the DU is the smallest unit in the delivery of the scalable media.

Unlike conventional audio coding, where the compressed audio bitstream is an integral unit, the scalable encoded audio consists of a set of DUs which are flexibly organized into packets for delivery based on the score calculated for each DU. Towards this end, the server controls the DUs to be delivered to the client, while the client feeds back information about network bandwidth, packet loss ratio and delivered packets. Such network feedback is well known to those skilled in the art, and will not be discussed further here. The sending bitrate is controlled through a conventional TCP-friendly Additive Increase Multiplicative Decrease (AIMD) algorithm. As noted above, to reduce packet overhead, multiple small DUs are packaged into a large network packet for delivery. When the data packet is delivered to the client, it is split back into individual DUs. The DUs, i.e., the bitstream segments of each individual subband are then merged together to form the coding bitstream of each subband.

However, as noted above, due to network packet loss, not all DUs are received, especially when the bandwidth is tight and the packet loss ratio is high. Nevertheless, the assembled bitstream of each subband forms a truncated bitstream, which can be decoded up to the truncation point. The original data frames and the regenerated data frames at the receiver may be substantially different, especially as some DUs may not be delivered to the receiver. However, it does not matter since the scalable decoder can still decode the audio, albeit low quality, from the delivered DU.

It is important to identify lost packets, and thus lost DUs, as soon as possible, so that a remedy can be applied. Consequently each data packet is marked with a sequence number. For purposes of this working example, a packet is considered lost if a packet with a sequence number three higher than the missing one is delivered. This number works well in a tested embodiment according to the present invention. Further, a conventional distinct acknowledgement mechanism termed joint-ACK-NACK feedback is utilized to feedback the packet loss information to the server. For the positive acknowledgement, a start sequence number and an end sequence number are provided in a joint-ACK-NACK message, along with an acknowledgement of the receipt of all packets within the sequence number range. The sequence numbers of all packets that are considered lost are then listed afterwards, which constitutes the negative acknowledgement part of the message. In this way, the positive and negative acknowledgement information is sent within a single message. Based on the number of delivered packets within a certain period of time, it is possible for the server to estimate both the network bandwidth and the packet loss ratio.

Given this feedback information, a network-aware rate-distortion optimization model according to the present invention is used to selectively transmit the DUs. Specifically, let the time window representing the audio media file be N+1 time slots. Let t=0 be the current time slot, and t=1,2,3, . . . , N be a sequence of N time slots in the future. Assume four subbands, or channels, within each time slot, with each subband being encoded into L DUs. For example, in a tested embodiment, the four subbands represented frequency ranges of 0 to 5.0125 kilohertz, 5.0125 kilohertz to 11.025 kilohertz, 11.025 kilohertz to 16.0375 kilohertz, and 16.0375 kilohertz to 22.05 kilohertz, respectively. Consequently, there are a total of 4L(N+1) DUs in the current time window. Further, let PLR be the current packet loss ratio of the network.

As noted above, DUs are indexed as DU(l,k,t), where l, k and t index the layer, subband and timeslot, respectively. Let the DU consume s(l,k,t) bits for coding. After decoding the DU, the distortion of the reconstructed audio will decrease by d(l,k,t). Let P(l,k,t) be the probability that the DU will be delivered to the client. If DU(l,k,t) has never been sent in the previous time slots, or a negative feedback of the data packet containing DU(l,k,t) has been received, P(l,k,t)=0, i.e., the DU is definitely not received by the client. If a positive feedback of the data packet containing the DU has been received, P(l,k,t)=1, i.e., the DU has definitely been received by the client. If the DU has been sent, but a feedback has not been received from the client, then P(l,k,t)=1−PLR. This concept can be summarized as:

$$P(l, k, t) = \begin{cases} 0 & \text{not sent or } NACK \text{ received} \\ 1 & ACK \text{ Received} \\ 1 - PLR & \text{sent, no acknowledgement} \end{cases}$$

As described above, a score, G(l,k,t), is assigned for each DU, which is the expected coding distortion decrease per bit sent if the DU is sent at the current time slot. A network-aware rate-distortion optimal delivery strategy according to the present invention then selectively transmits the DUs in the current time slot with the largest score so that the long-term play back quality of the delivered audio is maximized. Once the scores are calculated, the DUs having the largest scores are then selected. As described above the score, G(l,k,t), for each DU, is calculated based on a number of factors, including the coding distortion d(l,k,t), DU length s(l,k,t), delivery status P(l,k,t), current network packet loss ratio PLR, the reliance factor, on-time delivery probability, etc. In a tested embodiment, Equation 8 was used to calculate the scores for DUs in an encoded audio file.

Once these scores have been calculated, for all DUs at the current time slot or window, the server simply selects those DUs that offer the biggest gain, i.e., the biggest rate-distortion decrease. The server then sends as many DUs, in order of decreasing score, until the calculated bandwidth of the current time slot has been reached. The streamed packets, and thus DUs are then decoded and provided for playback as described above. This process continues until streaming of the media file has completed, or until such streaming is terminated by either the server or the client.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for streaming automatically and dynamically scalable media content over a network, comprising: analyzing a scalably encoded media file comprising at least one layered bitstream; determining a rate-distortion decrease attributable to each of at least one data units comprising each bitstream; computing a rate-distortion-based score for each data unit for a current network transmission timeslot; dynamically organizing at least one highest score data unit into a least one network packet in order of decreasing score, from highest to lowest; and transmitting the at least one network packet from a server to at least one client based on available network bandwidth.

2. The system of claim 1 further comprising computing a new rate-distortion-based score for each data unit for each new network transmission timeslot.

3. The system of claim 2 further comprising:
dynamically organizing at least one highest score data unit into a least one network packet in order of decreasing score, from highest to lowest for each new network transmission timeslot; and
transmitting the at least one network packet from a server to at least one client based on available network bandwidth for each new network transmission timeslot.

4. The system of claim 1 wherein the rate-distortion-based score computed for each data unit proportionally decreases as a size of each data unit increases.

5. The system of claim 1 further comprising automatically determining a network packet loss ratio.

6. The system of claim 1 wherein the rate-distortion-based score computed for each data automatically accounts for the network packet loss ratio.

7. The system of claim 1 further comprising receiving the at least one network packet at the at least one client.

8. The system of claim 7 wherein the at least one client automatically decodes the at least one network packet.

9. The system of claim 8 wherein each decoded network packet is streamed to a media player application.

10. The system of claim 8 wherein each decoded network packet is streamed to a media playback buffer which in turn provides the decoded network packets to a media player application after a predetermined delay.

11. The system of claim 1 further comprising automatically including forward error correction information in at least one network packet.

12. The system of claim 11 further comprising automatically correcting for at least one lost packet using the forward error correction information included in at least one network packet.

13. A computer-implemented process for providing network aware rate-distortion optimization for streaming media files over a network, comprising:
encoding at least one media file using a scalable encoder, wherein each encoded media file further comprises at least one layered bitstream, each bitstream comprised of at least one data unit;
scoring the data units comprising each layered bitstream with respect to a calculated rate-distortion decrease for each data unit;
dynamically arranging data units within network packets in order of highest score to lowest score;
transmitting at least one of the network packets from at least one server to at least one client, beginning with a network packet having the highest score data units; and
continuing to transmit all available network packets in decreasing order of contained highest score data units until a measured network bandwidth has been fully utilized.

14. The computer-implemented process of claim 13 wherein scoring the data units further comprises decreasing the score for each data unit in direct proportion to a byte size of each data unit to reflect a bandwidth cost of transmitting each data unit.

15. The computer-implemented process of claim 13 wherein scoring the data units further comprises modifying the score for each data unit to reflect a contribution of a reliance factor for each data unit, and wherein the reliance factor accounts for any relationships between data units wherein one or more current data units require receipt of one or more prior data units by a client before the current data units may be decoded.

16. The computer-implemented process of claim 13 wherein scoring the data units further comprises modifying the score for each data unit to reflect a contribution of a sent status for each data unit, and wherein the sent status indicates whether a particular data unit has already been transmitted within a network packet from the at least one server.

17. The computer-implemented process of claim 16 wherein the sent status further includes an indication of whether a NACK has been received by the at least one server following the attempted transmission of at least one network packet.

18. The computer-implemented process of claim 17 wherein the score for a particular data unit is set to zero if a network packet containing that data unit has been transmitted and no NACK has been received, and wherein data units having a score of zero are not retransmitted.

19. The computer-implemented process of claim 13 wherein scoring the data units further comprises modifying the score for each data unit to reflect a probability of on-time delivery for a data unit within a transmitted network packet, and wherein the score for each data unit decreases in direct proportion to a probability that that data unit can be delivered to a client in time for uninterrupted playback of the media file.

20. The computer-implemented process of claim 13 wherein scoring the data units further comprises modifying the score for each data unit to reflect a contribution of a balance factor for indicating an importance of near future time slots, and wherein those data units which must be delivered sooner to provide for uninterrupted playback of the media file are deemed more important than those data units which are not needed until a later time slot for uninterrupted playback of the media file.

21. A computer-readable medium having computer executable instructions for automatically and dynamically streaming scalable media content over a network, said computer executable instructions comprising:

scalably encoding a media file;

determining a rate-distortion for data units comprising the scalably encoded media file;

computing a score for each data unit based on adistortion decrease for each data unit and a size of each data unit, and wherein the score is recomputed for each timeslot of a network transmission;

arranging at least one of the data units into at least one network packet, wherein data units are placed into packets based on the score for each data unit, with higher scoring data units being given priority over lower scoring data units for each timeslot of the network transmission;

determining available network bandwidth for each timeslot of a network transmission between a server and at least one client; and transmitting all available packets from at least one server to at least one client beginning with a packet including the highest score data units, and continuing with packets having progressively lower data units until the available network bandwidth has been fully utilized for each timeslot of a network transmission.

22. The computer-readable medium of claim 21 wherein the score computed for each data unit further comprises any of a proportional decrease in score as a size of each data unit increases; a proportional increase in score as an automatically computed network packet loss ratio increases; a proportional increase in score to reflect a contribution of a reliance factor for each data unit, and wherein the reliance factor accounts for any relationships between data units wherein one or more current data units require receipt of one or more prior data units by a client before the current data units may be decoded; setting the score to zero for a particular data unit where a sent status indicates that the particular data unit has already been transmitted within a network packet; a proportional increase in score to reflect receipt of a NACK following the attempted transmission of at least one network packet; a proportional increase in score to reflect a probability of on-time delivery for a data unit within a transmitted network packet, and wherein the score for each data unit decreases in direct proportion to a probability that that data unit can be delivered to a client in time for uninterrupted playback of the media file; and a proportional increase in score to reflect a contribution of a balance factor for indicating an importance of near future time slots, and wherein those data units which must be delivered sooner to provide for uninterrupted playback of the media file are deemed more important than those data units which are not needed until a later time slot for uninterrupted playback of the media file.

23. The computer-readable medium of claim 21 wherein the at least one client automatically decodes the at least one network packet.

24. The computer-readable medium of claim 23 wherein each decoded network packet is streamed to a media player application.

25. The computer-readable medium of claim 23 wherein each decoded network packet is streamed to a media playback buffer which in turn provides the decoded network packets to a media player application after a predetermined delay.

26. The computer readable medium of claim 21 further comprising automatically including forward error correction information in at least one network packet.

27. The computer-readable medium of claim 26 further comprising automatically correcting for at least one lost packet using the forward error correction information included in at least one network packet.

* * * * *